US007431416B2

(12) United States Patent
Chung et al.

(10) Patent No.: US 7,431,416 B2
(45) Date of Patent: Oct. 7, 2008

(54) APPARATUS FOR JETTING AN ALIGNMENT AGENT

(75) Inventors: Doo-Han Chung, Yongin-si (KR); Jin-Soo Jung, Goyang-si (KR); Baek-Kyun Jeon, Yongin-si (KR); Jong-Sung Bae, Busan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 338 days.

(21) Appl. No.: 11/216,762

(22) Filed: Aug. 31, 2005

(65) Prior Publication Data

US 2006/0103687 A1 May 18, 2006

(30) Foreign Application Priority Data

Nov. 17, 2004 (KR) ..................... 10-2004-0094318

(51) Int. Cl.
*B41J 29/38* (2006.01)
*G02F 1/1337* (2006.01)

(52) U.S. Cl. ............................ 347/17; 347/6; 349/124; 349/127

(58) Field of Classification Search .................... 347/6, 347/17; 349/124, 127
See application file for complete search history.

(56) References Cited

U.S. PATENT DOCUMENTS

| | | | | |
|---|---|---|---|---|
| 2003/0001912 A1* | 1/2003 | Kusunoki | .................... | 347/11 |
| 2004/0239727 A1* | 12/2004 | Koyama | ...................... | 347/47 |
| 2005/0275676 A1* | 12/2005 | Parish et al. | .................. | 347/17 |

* cited by examiner

*Primary Examiner*—K. Feggins
*Assistant Examiner*—Jannelle M Lebron
(74) *Attorney, Agent, or Firm*—F. Chau & Associates, LLC.

(57) ABSTRACT

An apparatus for jetting an alignment agent includes a jetting head having a jetting hole, an alignment agent externally provided onto a substrate and a viscosity controlling part controlling a viscosity of the alignment agent stored in the jetting head to facilitate jetting of the alignment agent. The alignment agent is jetted to the substrate through the jetting hole. The apparatus improves the efficiency of jetting the alignment agent.

16 Claims, 9 Drawing Sheets

102

APPARATUS FOR JETTING AN ALIGNMENT AGENT

CROSS REFERENCE TO RELATED APPLICATION

This application claims priority under 35 U.S.C. §119 to Korean Patent Application No. 2004-94318 filed on Nov. 17, 2004, the content of which is incorporated by reference herein in its entirety.

BACKGROUND OF THE INVENTION

1. Field of the Invention

The present invention relates to an apparatus for jetting an alignment agent. More particularly, the present invention relates to an apparatus capable of improving the efficiency of jetting the alignment agent.

2. Description of the Related Art

In general, a liquid crystal display apparatus includes an array substrate, a color filter substrate facing the array substrate and a liquid crystal layer disposed between the array substrate and the color filter substrate. A first alignment layer and a second alignment layer are formed on the array substrate and the color filter substrate, respectively, to align liquid crystal molecules of the liquid crystal layer.

The first and second alignment layers are formed on the array substrate and the color filter substrate, respectively, for example, by a roller. Alternatively, the first and second alignment layers are formed on the array substrate and the color filter substrate, respectively, by jetting an alignment agent onto the array substrate and the color filter substrate by an inkjet process.

In forming the alignment layer using the roller, a first alignment agent having a viscosity of about 20 to about 30 cp (centipoise) is used. However, in forming the alignment layer using the inkjet process, a second alignment agent having a viscosity of about 10 to about 12 cp is used. The second alignment agent can be formed by diluting the first alignment agent.

When the second alignment agent is used for the inkjet process, the jetting performance is improved; however, diffusion of the alignment layer increases due to its relatively low viscosity, so that the alignment layer is aggregated at an edge portion of a substrate, thereby generating a stain at the edge portion of the substrate.

SUMMARY OF THE INVENTION

In accordance with one aspect of the present invention, there is provided an apparatus for jetting an alignment agent including a jetting head and a viscosity controlling part. The jetting head has a jetting hole through which an alignment agent externally provided is jetted onto a substrate. The viscosity controlling part controls a viscosity of the alignment agent stored in the jetting head to facilitate jetting of the alignment agent.

In accordance to another aspect of the present invention, there is provided an apparatus for jetting an alignment agent including a body having a storage space for storing an alignment agent; a jetting head having a jetting hole to jet the alignment agent through the jetting hole onto a substrate; a piezo-electric part disposed in the storage space to extrude the alignment agent towards the jetting hole onto a substrate; and a viscosity controlling part controlling a viscosity of the alignment agent stored in the jetting head to facilitate jetting of the alignment agent.

In accordance with the present invention, the viscosity controlling part that is provided in the jetting head controls the viscosity of the alignment agent prior to jetting the alignment agent towards the substrate. Thus, the efficiency of the jetting process of the alignment agent may be improved.

BRIEF DESCRIPTION OF THE DRAWINGS

The preferred embodiments of the present invention will become readily apparent by reference to the following detailed description when considered in conjunction with the accompanying drawings wherein.

DESCRIPTION OF PREFERRED EMBODIMENTS

The present invention now will be described more fully hereinafter with reference to the accompanying drawings, in which embodiments of the invention are shown.

Figure 1:
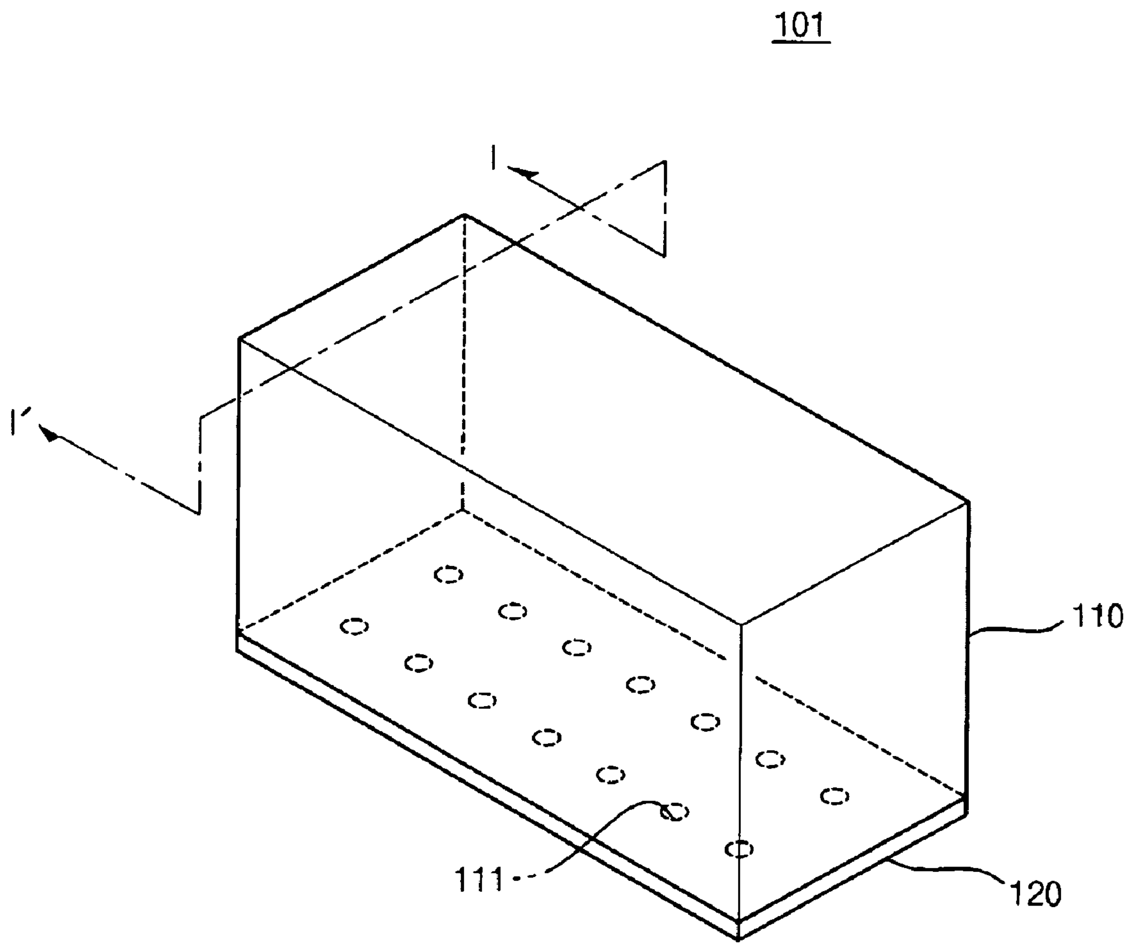
FIG. 1 is a perspective view illustrating an apparatus for jetting an alignment agent in accordance with an exemplary embodiment of the present invention.
Figure 2:
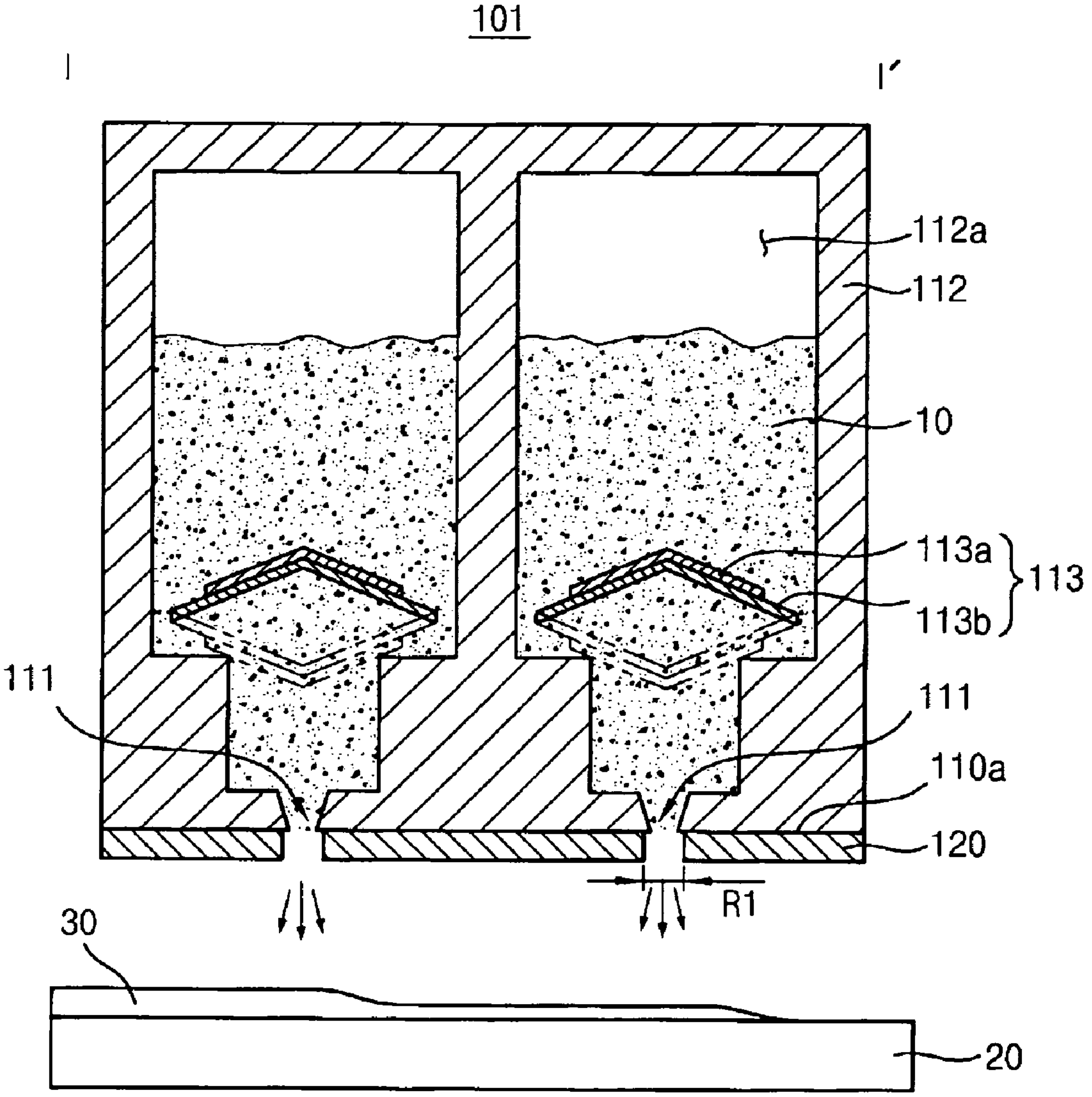
FIG. 2 is a cross sectional view taken along line I-I' in FIG. 1.

FIG. 1 is a perspective view illustrating an apparatus for jetting an alignment agent in accordance with an exemplary embodiment of the present invention. FIG. 2 is a cross sectional view taken along line I-I' in FIG. 1.

Referring to FIGS. 1 and 2, an apparatus for jetting an alignment agent 101 includes a jetting head 110 and a first viscosity controlling part 120.

A plurality of jetting holes 111 is formed at the bottom face 110*a* of the jetting head 110, and the jetting hole 111 jets an alignment agent 10 from the apparatus for jetting an alignment agent 101. The jetting head 110 includes a body 112 and a plurality of piezo-electric parts 113. The body 112 has a plurality of storage spaces 112*a* for storing the alignment agent 10. The piezo-electric parts 113 are disposed in the storage spaces 112*a*, respectively. The piezo-electric parts 113 extrude the alignment agent 10 toward the jetting holes 111.

Each of the piezo-electric parts 113 includes a piezo-electric element 113*a* and a vibrating plate 113*b*. When compression is applied to the piezo-electric element 113*a*, the piezo-electric element 113*a* generates an electric signal, and the vibrating plate 113*b* vibrates due to the electric signal. The alignment agent 10 stored in the storage space 112*a* is jetted onto a substrate 20 through the jetting hole 111 by vibration of the vibrating plate 113*b*. Therefore, an alignment layer 30 is formed on the substrate 20. A diameter of the jetting hole 111 is in a range of about 50 to about 100 μm.

The first viscosity controlling part 120 controls the viscosity of the alignment agent, so that the alignment agent 10 may be jetted smoothly through the jetting hole 111. In particular, the first viscosity controlling part 120 lowers the viscosity of the alignment agent 10, such that the viscosity of the alignment agent 10 is in a range of about 10 to about 12 cp.

The first viscosity controlling part 120 is disposed under the bottom face 110*a* of the jetting head 110. The first viscosity controlling part 120 lowers the viscosity of the alignment agent 10 before the alignment agent 10 is jetted onto a substrate through the jetting hole 111. The alignment agent 10 comprises a polyimide-based material.

Figure 3:
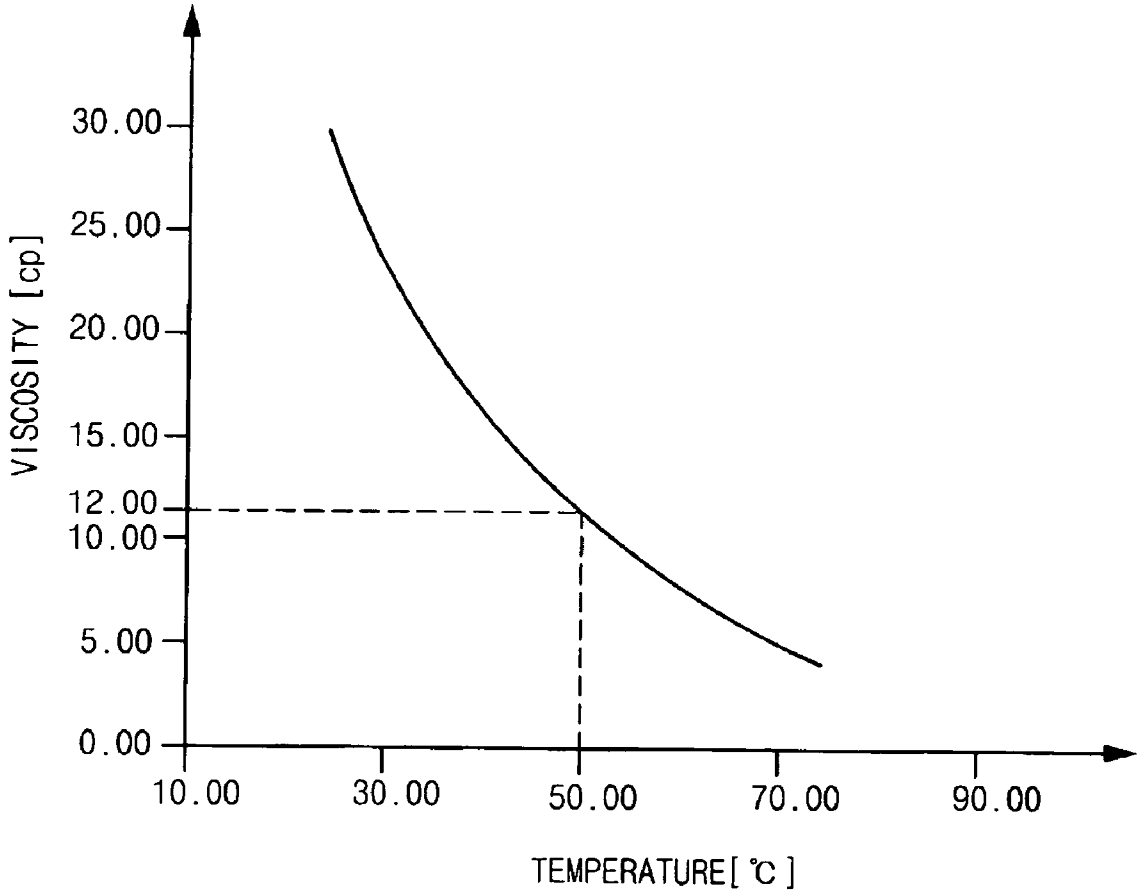
FIG. 3 is a graph illustrating a temperature-dependence property of an alignment agent in FIG. 2.

FIG. 3 is a graph illustrating the temperature-dependence property of the alignment agent in FIG. 2.

Referring to FIG. 3, the alignment agent 10 comprising the polyimide-based material has a viscosity of about 25 to about 30 cp at a room temperature of about 10° C. to about 30° C., and has a viscosity of less than about 12 cp at a temperature of more than about 50° C. Therefore, the alignment agent 10 has a viscosity of about 25 to about 30 cp before being heated by the first viscosity controlling part 120, whereas the alignment agent 10 has a viscosity of about 12 cp after being heated by the first viscosity controlling part 120.

Accordingly, the alignment agent 10 having a viscosity of about 12 cp is smoothly jetted through the jetting hole 111 having a diameter of about 50 to about 100 μm.

Figure 4:
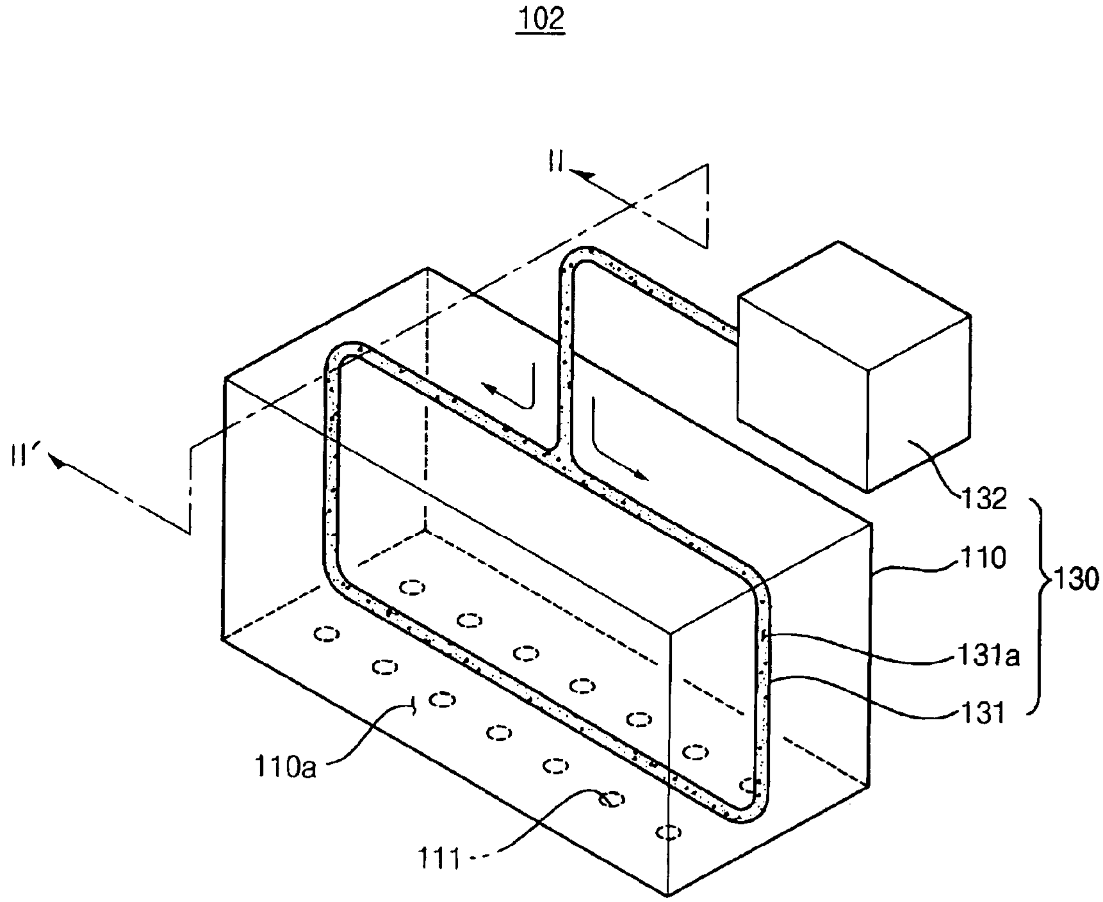
FIG. 4 is a perspective view illustrating an apparatus for jetting an alignment agent in accordance with another exemplary embodiment of the present invention.
Figure 5:
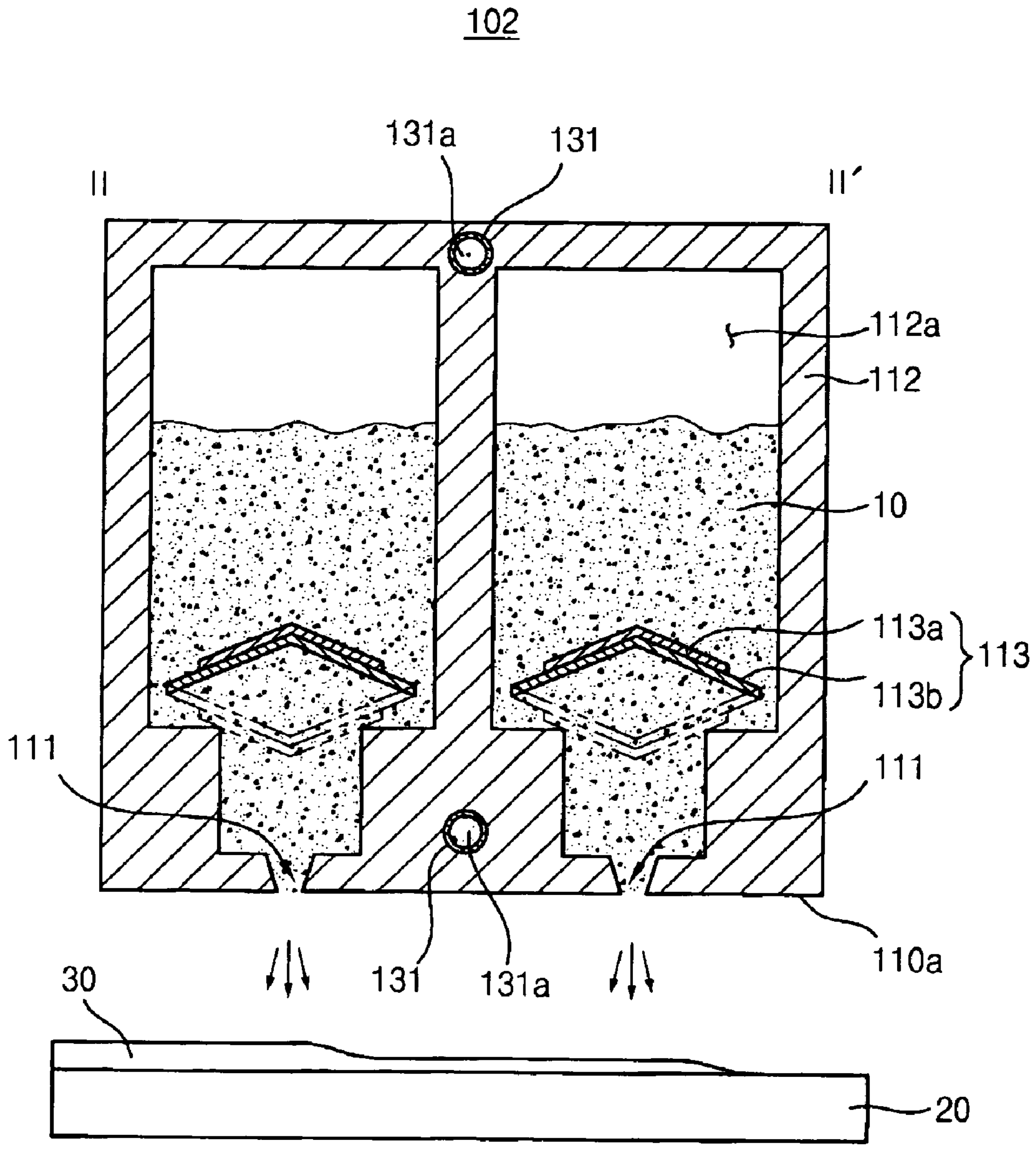
FIG. 5 is a cross sectional view taken along line II-II' in FIG. 4.

FIG. 4 is a perspective view illustrating an apparatus for jetting an alignment agent in accordance with another exemplary embodiment of the present invention. FIG. 5 is a cross sectional view taken along line II-II' in FIG. 4.

Referring to FIGS. 4 and 5, an apparatus for jetting an alignment agent 102 includes a jetting head 110 and a viscosity controlling part 130.

A plurality of jetting holes 111 is formed at a bottom face 110*a* of the jetting head 110, and an alignment agent 10 is jetted through the jetting hole 111. The jetting head 110 includes a body 112 and a plurality of piezo-electric parts 113. The body 112 has a plurality of storage spaces 112*a* for storing the alignment agent 10. The piezo-electric parts 113 are disposed in the storage spaces 112*a*, respectively. The piezo-electric parts 113 extrude the alignment agent 10 toward the jetting holes 111.

The viscosity controlling part 130 includes a heat pipe 131 disposed in the body 112 and a heat supplying part 132 supplying a heat medium 131*a* such as a heated solution and a heated gas to the heat pipe 131. The gas may include a water vapor, and the solution may include oil.

When the heat medium 131*a* is provided to the heat pipe 131, the alignment agent 10 stored in the storing space 112*a* is heated to a temperature of more than about 50° C. Then, the viscosity of the alignment agent 10 is lowered to a viscosity of less than about 12 cp. The heated alignment agent 10 may be smoothly jetted onto the substrate 30 through the jetting hole 111 having a diameter of about 50 to about 100 μm. Accordingly, an alignment layer 30 is formed on the substrate 20.

After the alignment agent 10 is jetted onto the substrate 20, the viscosity of the alignment agent 10 increases to a range of about 25 to about 30 cp. Therefore, staining due to the aggregation of the alignment agent 10 may be prevented at an edge portion of the substrate 20.

Though not shown, the heat pipe 131 may be branched into three pipes around the bottom face 110*a* of the jetting head 110. Therefore, the alignment agent 10 may be effectively heated by the three pipes that are branched from the heat pipe 131 before the alignment agent 10 is jetted to the substrate 20.

Figure 6:
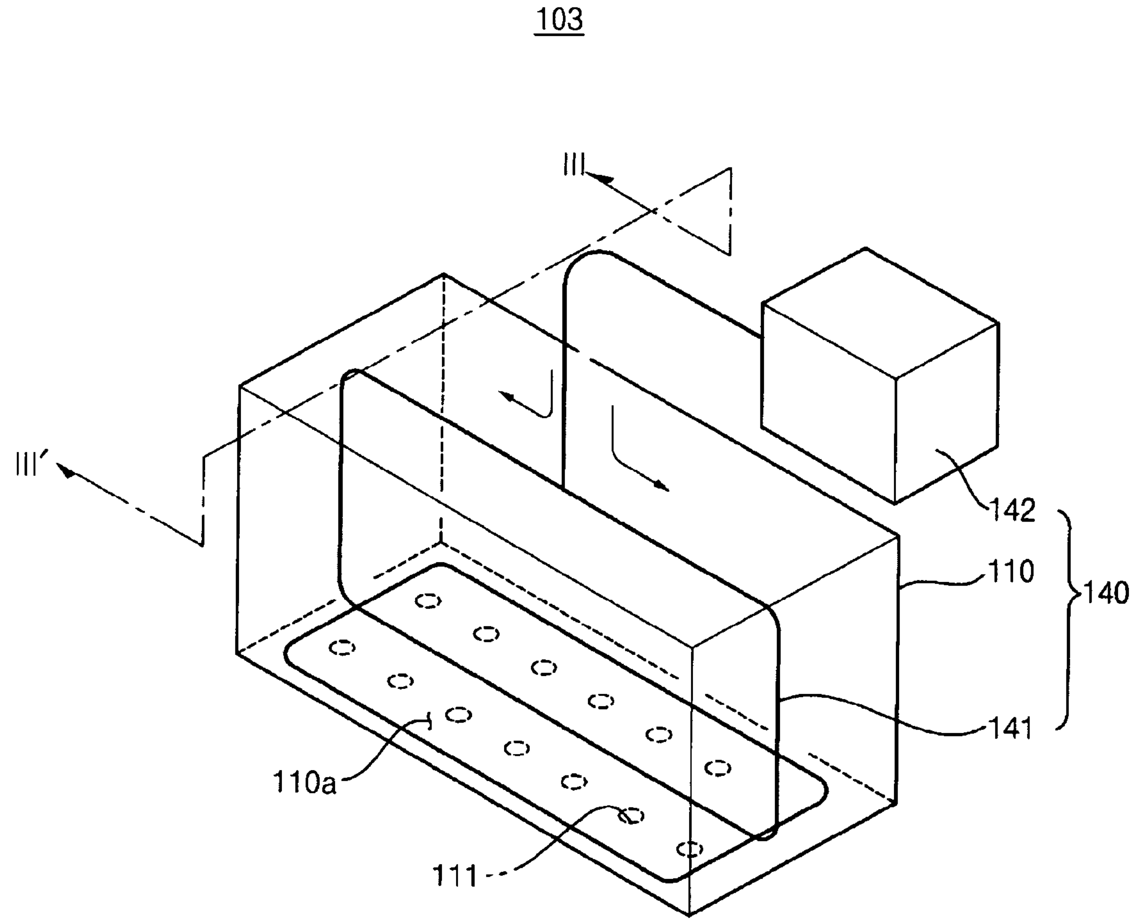
FIG. 6 is a perspective view illustrating an apparatus for jetting an alignment agent in accordance with still another exemplary embodiment of the present invention.
Figure 7:
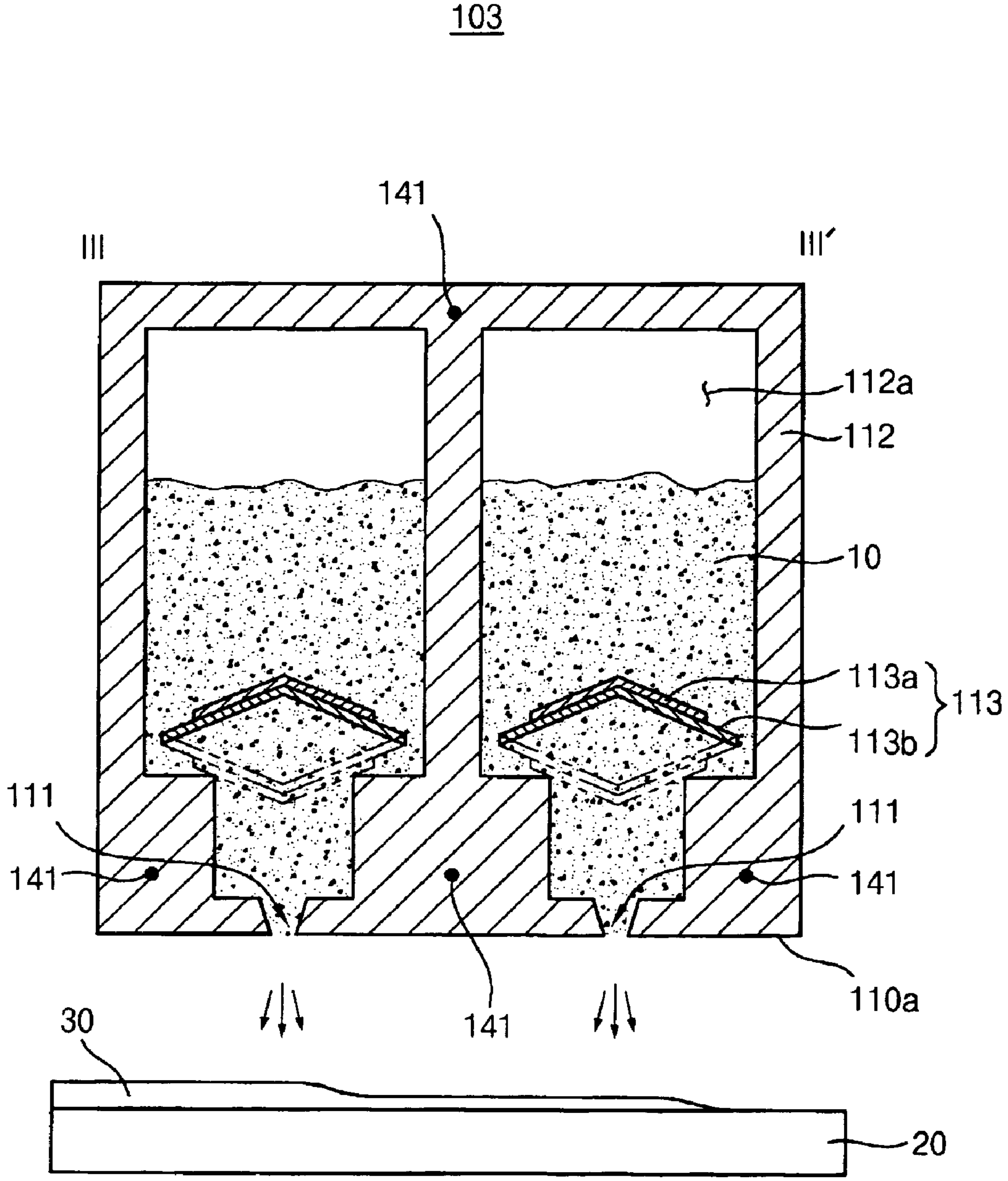
FIG. 7 is a cross sectional view taken along line III-III' in FIG. 6.

FIG. 6 is a perspective view illustrating an apparatus for jetting an alignment agent in accordance with still another exemplary embodiment of the present invention. FIG. 7 is a cross sectional view taken along a line III-III' in FIG. 6.

Referring to FIGS. 6 and 7, an apparatus for jetting an alignment agent 10 includes a jetting head 110 and a viscosity controlling part 140.

A plurality of jetting holes 111 is formed at a bottom surface 110*a* of the jetting head 110 for facilitating jetting an alignment agent 10 therethrough onto the substrate 20. The jetting head 110 includes a body 112 and a plurality of piezo-electric parts 113. The body 112 has a plurality of storage spaces 112*a* for storing the alignment agent 10. The piezo-electric parts 113 are disposed in the storage spaces 112*a*, respectively. The piezo-electric parts 113 extrude the alignment agent 10 toward the jetting holes 111.

The viscosity controlling part 140 includes a heat line 141 disposed in the body 112 and a heating part 142 heating the heat line 141 by applying electrical power to the heat line 141.

Alternatively, the heat line 141 may be branched into three pipes around the bottom face 110*a* of the jetting head 110. Therefore, the alignment agent 10 may be effectively heated by the three pipes that are branched from the heat line 141 before the alignment agent 10 is jetted toward the substrate 20.

The heat line 141 heats the alignment agent 10, so that the alignment agent 10 is heated to a temperature of more than about 50° C. Then, the viscosity of the alignment agent 10 is lowered to a viscosity of less than about 12 cp. Therefore, the heated alignment agent 10 may be smoothly jetted to the substrate 20 through the jetting hole 111 having a diameter of about 50 to about 100 μm. Accordingly, an alignment layer 30 is formed on the substrate 20.

After the alignment agent 10 is jetted to the substrate 20, a viscosity of the alignment agent 10 increases to a range of about 25 to about 30 cp. Therefore, staining due to the aggregation of the alignment agent 10 is prevented at an edge portion of the substrate 20.

Figure 8:
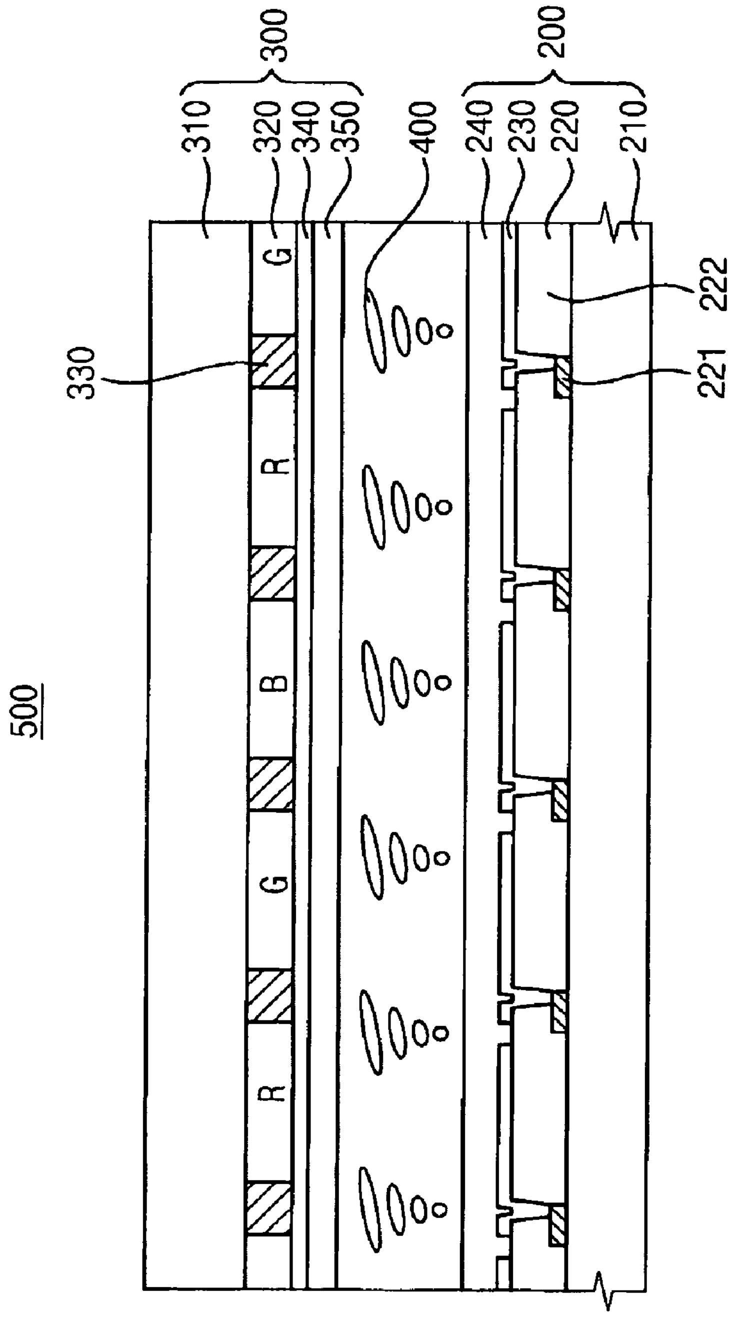
FIG. 8 is a cross sectional view illustrating a display apparatus having a first alignment layer and a second alignment layer that are formed by an apparatus for jetting an alignment agent.

FIG. 8 is a cross sectional view illustrating the display apparatus having a first alignment layer and a second alignment layer that are formed by an apparatus for jetting an alignment agent.

Referring to FIG. 8, a display apparatus 500 includes an array substrate 200, a color filter substrate 300 corresponding to the array substrate 200 and a liquid crystal layer 400 disposed between the array substrate 200 and the color filter substrate 300.

The array substrate 200 includes a first substrate 210, an array layer 220, a pixel electrode 230 and a first alignment layer 240. The array layer 220 is formed on the first substrate 210. The array layer 220 includes a thin film transistor 221 and an insulating layer 222 covering the thin film transistor 221. The insulating layer 222 includes a contact hole exposing a drain electrode (not shown) of the thin film transistor 221.

The pixel electrode 230 is formed on the array layer 220. The pixel electrode 230 is electrically connected to the drain electrode of the thin film transistor through the contact hole. The pixel electrode 230 includes an optically transparent and conductive material such as indium tin oxide (ITO) and indium zinc oxide (IZO).

The first alignment layer 240 includes a polyimide-based material, and the first alignment layer 240 is formed on the pixel electrode 230. The first alignment layer 240 may be formed by using an inkjet method.

The color filter substrate 300 includes a second substrate 310, a color filter layer 320, a black matrix 330, a common electrode 340 and a second alignment layer 350. The color filter layer 320 includes color pixels such as a red color pixel 'R', a green color pixel 'G' and a blue color pixel 'B'. The color pixels are formed on the second substrate 310, and the color pixels are spaced apart from each other. The black matrix 330 is formed between the two color pixels that are adjacent to each other. Therefore, the black matrix 330 prevents the color interference among the two color pixels that are adjacent to each other.

The common electrode 340 is formed on the black matrix 330 and the color filter layer 320, and the common electrode 340 has a substantially constant thickness.

The common electrode 340 includes an optically transparent and electrically conductive material such as indium tin oxide (ITO), indium zinc oxide (IZO), etc.

The second alignment layer 350 includes a polyimide-based material, and the second alignment layer 350 is formed on the pixel electrode 230. The second alignment layer 350 may be formed by using an inkjet method.

The liquid crystal layer 400 is disposed between the array substrate 200 and the color filter substrate 300. In the present embodiment, the liquid crystal layer 400 includes, for example, twist nematic (TN) liquid crystals. The first and second alignment layers 240 and 350 are rubbed such that rubbing directions of the first and second alignment layers 240 and 350 are substantially perpendicular to each other. Alternatively, the liquid crystal layer 400 may include a vertically arranged liquid crystal molecules. In other words, the present invention may be applied to a VA-mode LCD apparatus.

Hereinafter, a process of forming a first alignment layer 240 will be described.

Figure 9:
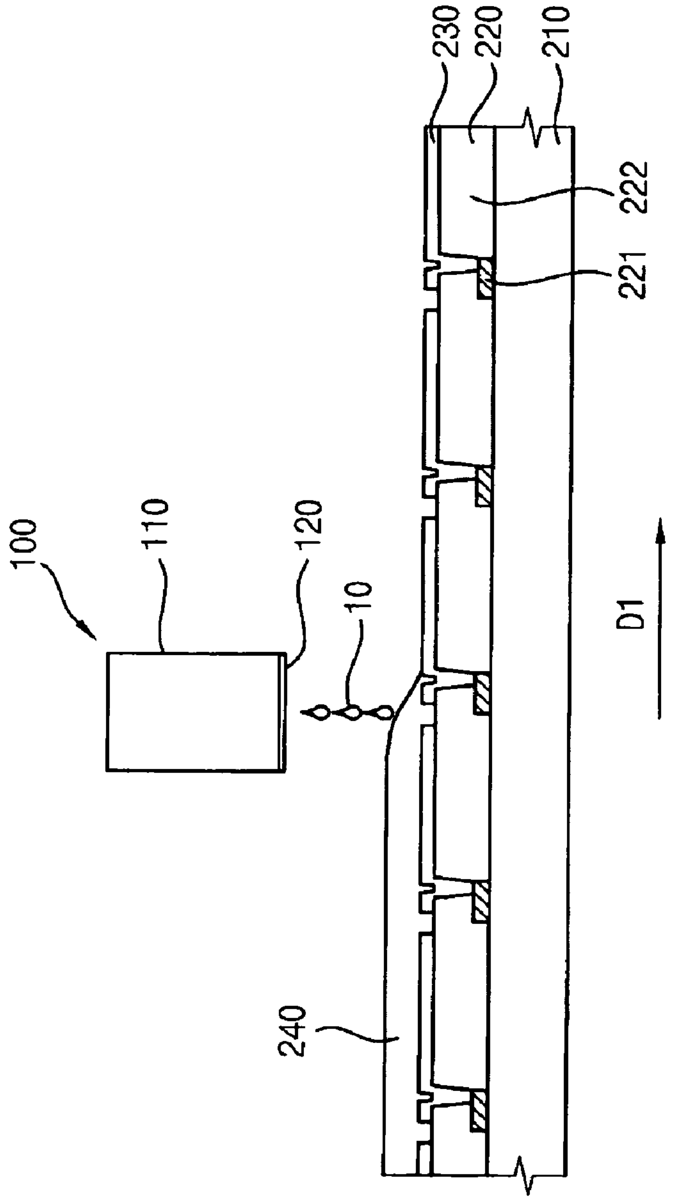
FIG. 9 is a cross sectional view illustrating a process of forming the first alignment layer in FIG. 8.

FIG. 9 is a cross sectional view illustrating a process of forming the first alignment layer in FIG. 8.

Referring to FIGS. 1 and 9, after an array layer 220 and a plurality of pixel electrodes 230 are sequentially formed, a first alignment layer 240 is formed on the pixel electrode 230 by using an apparatus for jetting an alignment agent 100. The apparatus 100 jets the alignment agent 10 onto the pixel electrodes 230 as moving along a first direction D1. Therefore, the alignment layer 240 is printed from one end of the first substrate 210 to the other end of the first substrate 210.

The apparatus 100 includes a jetting head 110 and a first viscosity controlling part 120. The first viscosity controlling part 120 heats the alignment agent 10 stored in the jetting head 110. The viscosity of the alignment agent 10 is lowered to less than about 12 cp by the first viscosity controlling part 120. Therefore, the alignment agent 10 is smoothly jetted onto the pixel electrode 230 through the jetting hole 111 formed in the jetting head 110.

After the alignment agent 10 is jetted to the substrate 20, the viscosity of the alignment agent 10 increases to a range of about 25 to about 30 cp. Therefore, staining due to an aggregation of the alignment agent 10 is prevented at an edge portion of the array substrate 210 because the diffusion property of the alignment agent 10 jetted on the pixel electrode 230 increases.

According to the above, the jetting head of an apparatus for jetting an alignment agent according to an embodiment of the present invention has a viscosity controlling part to heat the alignment agent to lower the viscosity of the alignment agent. Therefore, the alignment agent is smoothly jetted to a substrate through a jetting hole formed in the head part.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. An apparatus for jetting an alignment agent comprising:

a jetting head having a storage space for storing an alignment agent and a jetting hole through which the alignment agent is jetted onto a substrate; and a viscosity controlling part controlling the viscosity of the alignment agent stored in the jetting head, wherein the viscosity controlling part comprises:

a heat pipe disposed in the jetting head, the heat pipe raising a temperature of the alignment agent stored in the jetting head; and a heat supplying part disposed outside of the jetting head and supplying a heated gas or a heated solution to the heat pipe.

2. The apparatus of claim 1, wherein the viscosity controlling part includes a temperature controller to control the temperature of the alignment agent.

3. The apparatus of claim 2, wherein the viscosity controlling part heats the alignment agent, to lower the viscosity of the alignment agent.

4. The apparatus of claim 1, wherein the alignment agent includes a polyimide-based material.

5. The apparatus of claim 2, wherein the viscosity controlling part heats the alignment agent to raise a temperature of the alignment agent about or more than 50° C.

6. The apparatus of claim 5, wherein the alignment agent that is heated has a viscosity of less than about 12 cp.

7. The apparatus of claim 1, wherein the viscosity controlling part is disposed in the jetting head.

8. The apparatus of claim 1, wherein the viscosity controlling part is disposed outside the jetting head.

9. The apparatus of claim 8, wherein the viscosity controlling part is disposed under a bottom surface of the jetting head.

10. The apparatus of claim 1, wherein the viscosity controlling part comprises:

a heat line disposed in the jetting head the heat pipe raising a temperature of the alignment agent stored in the jetting head; and a heating part disposed outside of the jetting head and providing electrical power to the heat line for heating the heat line.

11. The apparatus of claim 1, wherein the jetting part has a diameter ranged from about 50 μm to about 100 μm.

12. The apparatus of claim 1, further comprising a piezo-electric part disposed in the storage space to extrude the alignment agent towards the jetting hole onto a substrate.

13. The apparatus of claim 12, wherein the piezo-electric comprises a piezo-electric element and a vibrating plate.

14. An apparatus for jetting an alignment agent comprising:

a jetting head having a storage space for storing an alignment agent and a jetting hole through which the alignment agent is jetted onto a substrate; and a viscosity controlling part controlling the viscosity of the alignment agent stored in the jetting head, wherein the viscosity controlling part includes a heat pipe disposed in the interior of jetting head, the heat pipe raising a temperature of the alignment agent stored in the jetting head and a heat supplying part disposed outside of the jetting head for heating the heat pipe and wherein the heat pipe has a closed structure within the interior of the jetting head such that a heating source received by the heat pipe from the heat supplying part for heating the heat pipe does not flow out of the heat pipe and into the interior of the jetting head.

15. The apparatus of claim 14, wherein the heating source supplied from the supplying part to the heat pipe is a heated gas or a heated solution.

16. The apparatus of claim 14, wherein the heating source supplied from the supplying part to the heat pipe is electrical power.

* * * * *